Nov. 10, 1964 H. BEYER 3,156,854
WOUND CAPACITOR WITH INTERNAL IMPREGNATING TUBE
Original Filed April 2, 1953 2 Sheets-Sheet 1
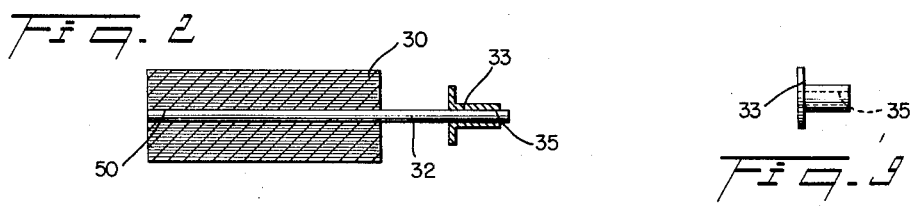
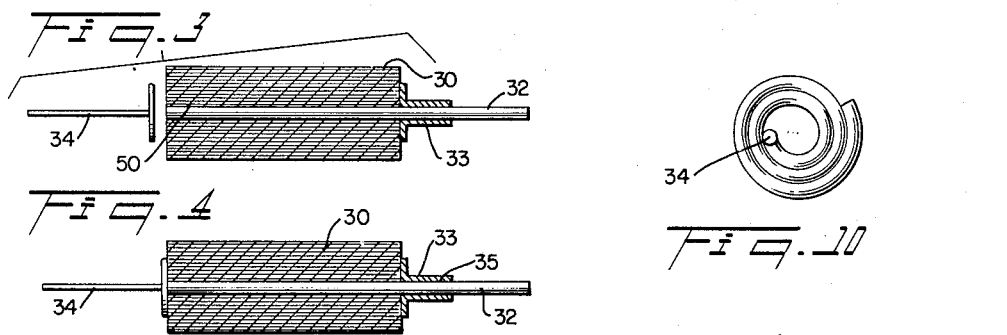
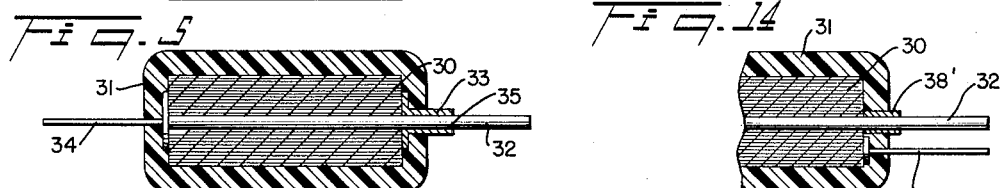
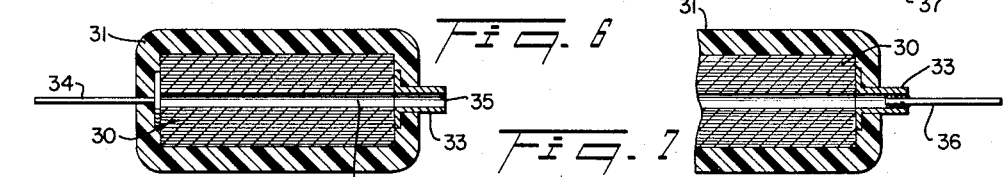
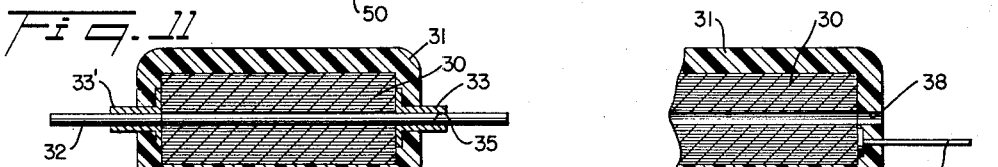
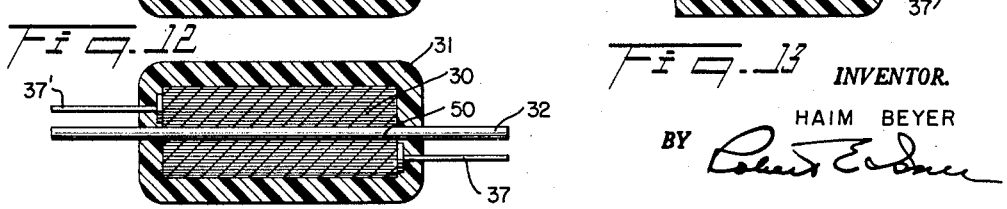
INVENTOR.
HAIM BEYER
BY
ATTORNEY

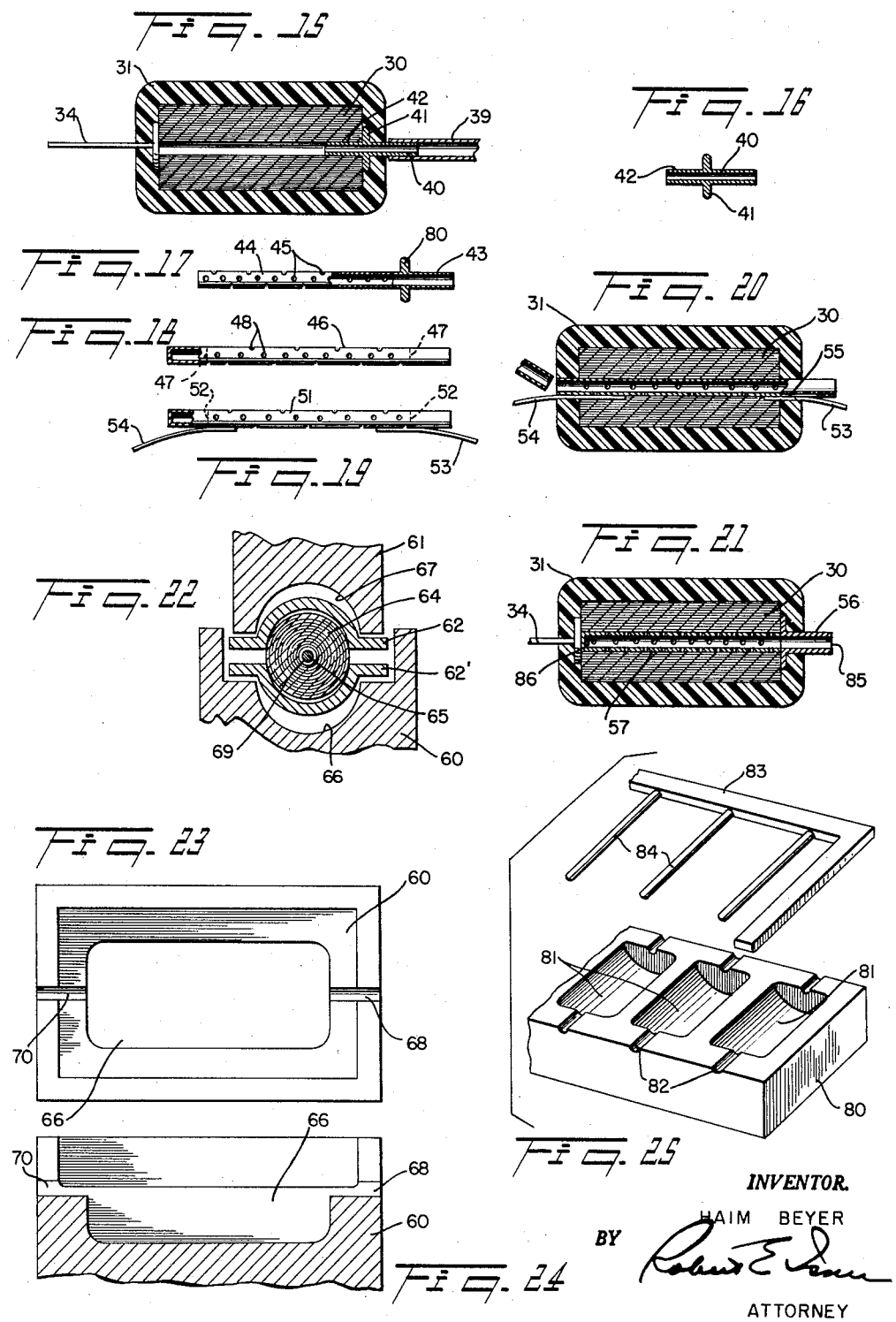

United States Patent Office 3,156,854
Patented Nov. 10, 1964

3,156,854
WOUND CAPACITOR WITH INTERNAL
IMPREGNATING TUBE
Haim Beyer, New Bedford, Mass., assignor to Cornell-Dubilier Corporation, South Plainfield, N.J., a corporation of Delaware
Original application Apr. 2, 1953, Ser. No. 346,412, now Patent No. 2,942,302, dated June 28, 1960. Divided and this application Sept. 25, 1959, Ser. No. 842,532
3 Claims. (Cl. 317—260)

This invention relates to capacitors of the type having a convolutely wound capacitor unit enclosed within a protective case of resin or similar material which is molded directly on the surface of the capacitor unit. This application is a division of my copending application Serial No. 346,412 filed April 2, 1953 now U.S. Patent No. 2,942,302.

It is often advantageous, as is well known, to impregnate the capacitor unit after it has been molded into its protective case. The problem presented by such a sequence of process steps is one of forming and preserving in the wall of the protective case, and at least partially within the body of the capacitor unit, an entry or port through which the impregnating liquid or oil will readily flow during the impregnating process, and for removal of moisture and air from the capacitor unit by the use of heat and vacuum, or other suitable means, prior to introduction of the impregnating liquid or oil. The convolutely wound capacitor unit, usually made of thin metal foils and paper or plastic strips, or of strips of metalized paper or plastic, will yield and distort under the required pressures of the molding process. Moreover the molding of a protective envelope to define therein an easily sealed entry port presents difficulties if it is to be economically accomplished by mass production methods. Capacitors of the type above described are relatively small articles manufactured by mass methods and with a minimum of inspection of the sub-assemblies. Therefore, it is highly desirable to provide assembly methods which positively insure the required results so that the number of finally processed units which need be rejected is maintained at a minimum.

It is an object of this invention to provide capacitor assemblies which promote, at a minimum of assembly time and cost, the production of molded units which can be readily impregnated. It is a further object of the invention to provide capacitor assemblies by which distortion of the wound capacitor unit can be controlled during the molding process. Another object of the invention is to provide a capacitor assembly having a passage for the impregnating liquid, and for removal of moisture and air before impregnation, the passage being protected against the action of the molding pressures.

The winding of the convolute capacitor units herein referred to, the molding of a protective envelope or case around those units, the drying of the units if desired, and the subsequent impregnation steps take various forms and are not illustrated or described herein except to such extent as is desirable to point out the problems encountered during the molding step.

The drawings appended hereto illustrate the assembly methods of this invention in various of its forms. In the drawings:

FIGURES 1 to 7, inclusive, illustrate successive steps in the presently preferred practice of the invention, each of these figures showing a convolute capacitor unit and, in FIGS. 5, 6 and 7, its molded covering in longitudinal section, together with associated parts or instruments, some of which are in section;

FIGURES 8, 9 and 10 are illustrative views of various parts shown in FIGS. 1 to 7, inclusive;

FIGURE 11 is a longitudinal section through a capacitor unit and its molded case, illustrating an assembly step alternative to that illustrated in FIGS. 4 and 5;

FIGURES 12 and 13 illustrate another method of assembly within the purview of this invention, the capacitor unit and its case again being shown in longitudinal section;

FIGURE 14 illustrates an alternate manner of applying the assembly methods illustrated in FIGS. 12 and 13;

FIGURE 14, showing both the capacitor unit and the molded covering, as well as some of the associated parts, in longitudinal section, illustrates yet another method of assembly in which the principles of the invention are applied;

FIGURES 16 and 17, the first in section and the latter partially in section, illustrate types of parts which can be alternatively used in the method of assembly indicated by FIG. 15;

FIGURES 18 and 19 show perforate tubular mandrels such as may be used in the method of assembly illustrated in FIG. 20;

FIGURE 20 illustrates another method of assembly embodying the principles of the invention, most of the parts being shown in longitudinal section;

FIGURE 21 illustrates a further way of applying the principles of the invention, most of the parts being shown in longitudinal section;

FIGURES 22, 23 and 24 illustrate a molding process, to the operation of which the methods of this invention may be applied, FIG. 22 being a transverse section through various parts indicatively assembled in molding position, FIG. 23 being a top plan view of the lower mold shown in FIG. 22, and FIG. 24 being a view of the mold along the section indicated by the section line A—A in FIG. 24; and FIGURE 25 is an indicative perspective view of the lower portion of a multiple mold associated with a device illustrative of one means which may be conveniently, but not necessarily, used to further the methods of assembly to which this invention has reference.

FIGURES 1 to 7, inclusive, illustrate the presently preferred method of assembly. There is provided for assembly purposes the convolutely wound capacitor unit 30 which, as the result of having been conventionally wound on a mandrel, is provided with, or defines, a central axially extending passage 50. Provided also are conventional terminal or pigtail wires 34, shown in FIG. 10, adapted to be soldered, or otherwise joined, to the edges of metallic elements exposed at an end of the capacitor unit. Provided also are metallic tubular elements, such as the eyelets 33, adapted to be soldered, or otherwise joined to the edges of metallic elements exposed at the other end of the capacitor unit. The purpose of these hollow or tubular eyelets is three-fold, since the eyelet provides an electrical connection with the metallic element and likewise, as will appear, defines a port or orifice through which air and moisture may pass during drying and through which impregnant may pass to the capacitor unit during the subsequent impregnation step. So long as these functions, and particularly the latter, are performed the size, shape or configuration of the tubular element 33 is not of importance, the eyelet form shown being most convenient. Provided also are a number of inserts, such as the pin 32, which may be made of material such as metal or plastic. These inserts 32 are preferably longer than the combined length of the capacitor unit 30 and the tubular element 33 and are so sized in cross section as to permit passage of the insert through the tubular element 33 and the axial passage 50 of the capacitor unit. Preferably the cross section of the insert is so sized and shaped as to substantially fill the orifice 35 defined by the tubular element 33. In the method of assembly now being described the first step is the insertion of an insert 32 into the capacitor unit, as shown in FIG. 2. The operator is thus provided with a centering device which quickly and accurately centers the tubular element 33 with respect to the axial passage 50 of the unit 30. Thus by merely slipping the eyelet 33 over and along the portion of insert 32 which protrudes beyond the end of the capacitor unit, it is insured that the eyelet 33 will positively assume the position illustrated in FIG. 3 and will be there positively held while it is soldered or otherwise attached to the protruding edge of a metallic element of the capacitor unit.

In the next step of assembly the terminal wire 34 is brought into position and attached to the other end of the capacitor unit, the result being the subassembly shown in FIG. 4. This subassembly is then placed in a suitable mold and provided with a molded case 31 formed of a plastic or resin, usually of a thermosetting type. The type of material used to form the casing may vary according to the requirements. Conventionally used are the various formaldehyde resins, but varieties of polyvinyl resins, acrylate resin, the various rubbers and the like may, as is known, be used when desired.

During this molding step the insert 32, being relatively non-yieldable as compared with the body of the capacitor unit, acts as a supporting member, preventing undue distortion of the otherwise unsupported capacitor unit 30 which, being somewhat soft and yielding, tends to collapse into the axial bore or passage 50. In addition, the insert 32 prevents closing of the passage 50 during molding, thereby insuring that there will be present in the molded assembly a clear path through which impregnant may be later fed or flowed along the entire length of the capacitor unit. Furthermore the insert 32, protruding through and beyond the opening 35 in the eyelet 33, insures that during the molding operation the opening 35 will not become plugged by the molding compound. Also the insert 32 forms a support which tends to withstand the action of any force applied laterally to the eyelet 33, thus further insuring that the soldered bond or other type of joint made between that eyelet and the metal elements of the capacitor unit 30 will not be broken by such force.

After molding is completed, the insert 32 is removed from the now encased unit (compare FIGS. 5 and 6). Thereafter the unit is sent to the impregnating process, which process may, when necessary or desirable, be preceded by the step of removing moisture and air from the capacitor unit. In this step, which is usually considered necessary, the unit is preferably subjected to heat and vacuum to force the moisture and air from the capacitor unit, and such moisture and air flow from the passage 50 through the tubular element 33. When drying is completed, the unit is then subjected to the impregnating process where the oil or liquid impregnant is caused to flow through the tubular element 33 into the passage 50. Impregnation being complete, the orifice 35 of the eyelet 33 is sealed preferably, as shown in FIG. 7, by the insertion and connection of a terminal wire 36 or, if a terminal wire is not required, by insertion of a plug, such as a drop of solder into the orifice.

From the above it will be at once apparent that the described assembly method assures in a positive manner, and apart from the skill of the operator, that the tubular eyelet is assembled in registry with the axial passage through the capacitor thereby to define a path of impregnant flow axially throughout the capacitor unit; that this path of flow is maintained against the pressure of the molding step and against inadvertent plugging thereof by flow of the molding compound; and that the yieldable capacitor unit is uniformly supported to minimize harmful distortion. The total effect of these positive results is the production of uniform capacitor assemblies and the minimization, if not elimination, of intermediate inspections of the assemblies during manufacture.

In addition, other advantages of equal importance are obtained. The convolutely wound capacitor unit 30 is usually composed of extremely thin bands of metal and paper or plastic and the end of the unit, as is well known, is consequently of such nature that any soldered, brazed or other type of bond between the metallic elements of the unit 30 and the eyelet 33 is weak. Therefore, either during handling prior to molding or during molding any force unevenly applied to the eyelet 33 may tend to break the fragile bond between it and the capacitor unit. The provision of the insert 32 during these operations prevents the eyelet 33 from tilting or shifting and thus insures the maintenance of the desired bond between the eyelet and the capacitor unit until the mold casing has been added and the relative position of the eyelet and the capacitor unit are rigidly established.

It is also known that distortion or partial collapse of the capacitor unit 30 under the molding pressures will tend to cause the thickness of the molded resin case to vary, thus resulting in relatively thick and relatively thin areas in the wall of the case. Such areas are structurally and electrically undesirable and are not readily observed by inspection except where present to an extreme degree. By providing a support, such as the insert 32, axially of the capacitor unit during the pressure molding, flattening of the axial passage 50 is avoided and distortion of the capacitor unit is minimized. The problems encountered during molding of the resinous case around the capacitor assembly are partially illustrated by consideration of a molding apparatus and method, the principal parts of which are illustrated in the FIGS. 22, 23 and 24. This apparatus consists essentially of a lower mold 60 and an upper mold and pressure element 61. In the lower mold element 60 is formed a mold cavity 66 from which extend the slots 68 and 70. These slots are shaped to receive connecting wires, such as the pigtail 34 shown in FIG. 10, or in the practice of this invention the extending end of the supporting insert, such as illustrated in FIGS. 3, 4 and 5, not only to protect these elements against crushing or distortion as the mold elements 60 and 61 are brought together but, likewise, to hold the capacitor assembly centrally of the mold cavity so that it will not shift therein as pressure is initially applied. In the upper mold element 61 there is provided the mold cavity indicated at 67. In the operation of this molding device a capacitor unit, such as that shown at 64 in FIG. 22, is assembled with the resin preforms 62 and 62' and placed in the lower mold cavity 66. The upper mold 61 is then lowered to apply pressure which, under the heat conditions conventially established, forces the resin of the preforms around the capacitor assembly. Absent the provision of an insert 65 through the axial passage 69 of the capacitor unit in accordance with the principles of this invention, the tendency and result of the applied pressure is to flatten the yieldable capacitor unit 64, thus changing spatial relations between the surface of the unit and the surfaces of the mold cavities 67 and 66. It is this shift in spatial relations which is, partially at least, prevented by the presence of the insert 65.

The sequence of operations illustrated in FIGS. 1 to 7 may, it will be apparent, be changed without losing all of the advantages secured by the practice of the invention. For instance, the connecting wire 34 may be assembled to the capacitor unit 30 at any time prior to the molding step and none of the advantages above described will be minimized. Also the tubular member 33 may be assembled to the capacitor unit 30 prior to the placing of the insert 32 into the assembly, in which case most of the advantages above described will be secured.

It is also feasible to impregnate the capacitor unit at a time prior to the molding operation. In this case the insert 32 may be removed, if previously inserted, during the drying and subsequent impregnation step or, if desired, the insert 32 previously inserted may remain in place during these steps if it is so sized that it does not too seriously block the escape of moisture and air from the interior of the unit or the subsequent passage of the impregnant into the unit.

A convenient alternate form of the invention is illustrated in FIG. 11, where the capacitor unit 30 has been provided with tubular elements 33 and 33', and the insert 32 has been provided in such length that it passes through, and outwardly of, each of the tubular elements. The advantages secured by this modification are the same as those previously described. The usefulness of this arrangement is most pronounced where it is desired to impregnate the molded capacitor from both ends, or where it is desired, in a mold arrangement such as shown in FIGS. 22, 23 and 24, to provide for registry with a slot, such as 68 or 70, a stronger and stiffer member than is usually provided by the connecting wire. In this latter event the temporary insert 32 is provided in the desired strength and stiffness, and after molding and impregnation connecting wires are provided, such as illustrated by the wire 36 shown in FIG. 7.

In the further alternate form shown in FIGS. 12, 13 and 14, the electrical connectors 37 and 37' are attached to the capacitor unit 30 at any convenient position, such as the position illustrated, no tubular elements are provided, and the insert 32 is inserted, prior to molding, in the position shown in FIG. 12 and FIG. 14, thereby serving the additional function of a core to form, during molding, an orifice or entry through the resin case. On withdrawal of the insert 32 upon the completion of the molding operation, the entry ports thus formed, illustrated at 38 in FIG. 13, may be used for entry of the impregnant and thereafter sealed. If the conditions of the molding operation are such that difficulty is encountered in removing insert 32 after the molding operation, there may be provided on the insert prior to molding a slip ring such as the metal ring illustrated at 38' in FIG. 14 to facilitate removal. This slip ring can be made of any material, such as paper, which will not bind or adhere to the insert 32.

Where the use of a temporary supporting insert within the central axial bore of a convolute capacitor unit is not desirable, the principles and many of the advantages of this invention may be achieved in various ways. For instance, a tubular element may be provided with a shank dimensioned to extend at least part way through the central passage of the capacitor unit, thus providing inner support against molding pressures as well as insuring a clear path for the introduction of impregnant into the interior of the unit. Two such examples of tubular elements are shown in FIGS. 16 and 17. The element of FIG. 16 is, in effect, a tube provided with a shoulder 41 which seats on the end of the capacitor unit and may be attached thereto. The end 40 of this element extends outwardly of the unit, as shown in FIG. 15, and beyond the wall of the molded resin case 31, to provide an entry for the impregnant. The end 42 of the tubular element extends inwardly of the axial passage defined by the capacitor unit 30 and insures that a clear path for impregnant flow into the central portion of the capacitor will be maintained, and at least a part of the unit will be supported against the molding pressure. If the inwardly extending shank of the tubular element is to be extended throughout the length of the capacitor unit, it is usually necessary to supply a slotted or perforate shank so that, in the later impregnation operation, flow of the impregnant to the convolutely wound unit will be possible. Such is the form of the tubular element shown in FIG. 17, which is provided with a seating shoulder 80, an outer end 43 and a perforate shank 44 having in its surface a number of holes 45.

In the particular form shown the shoulder portion 80 and outer end portion 43 of the tube is made of metal, so as to provide an electrical connection, whereas the shank 44 is composed of a non-conducting material, such as a resin, a precaution usually necessary to prevent electrical shorting of the metallic elements of the capacitor unit. While the tubular elements of FIGS. 16 and 17 are shown with open outer ends, these ends may, if desired, be closed, as is the end 85 of the tubular eyelet 56 illustrated in FIG. 21, to prevent plugging of the tube during molding, and thereafter opened, by a drilling or cutting operation, to allow entry of the impregnant. Where the tubular elements, such as those shown in FIGS. 16 and 17, are open-ended, the end may be effectively sealed during molding by temporarily placing over it a sealing member, such as the tube 39 of FIG. 15, which member may also be sized to fit within a mold slot such as the slots 68, 70 shown in FIGS. 23 and 24, thereby acting as a centering device during the molding operation.

The alternate form of the invention illustrated in FIGS. 18, 19 and 20 may under certain conditions of manufacture offer many advantages. In this form a tubular element serves as the winding mandrel during the winding of the conducting and dielectric strips into the capacitor unit and thereafter remains in the unit to act as a supporting element during the molding step and as a flow channel for the impregnant during the impregnation step. A convenient form of such a tubular element is the plastic tube 51 shown in FIG. 19. As shown, the body of this tube is perforate throughout its central portion and imperforate at its end portion. At a suitable distance 52 from each end the tube is scored or weakened. Assembled with the tube, and attached thereto at points inwardly of the scorings 52, are electrical connectors 53, 54. The capacitor unit 30 is formed on this tubular element to produce the assembly indicated in FIG. 20 and is then provided with the molded resin case 31. After molding is completed, the ends of the tube which extend outwardly of the resin case may be broken off at the line of weakness, as indicated at the left of FIG. 20, and after impregnation the ends of the tube may be sealed. If desired, the tubular element may take the simpler form shown in FIG. 18. Here the tube 44 has a perforate central portion and imperforate ends, and each end is weakened, as by scorings 47 at points adjacent the ends. When such a tubular element is used in the manner just described, separate electrical connections must be provided, for instance, in the form and position of the electrical connectors 37, 37' shown in FIG. 12.

If desired, the tubular element on which the unit is wound and later supported may take other forms, such as that shown in FIG. 21. Here the perforate tube 57 has a length corresponding to the length of the unit 30 and, in the specific assembly shown, has a closed end 86. To the unit wound on this tubular element is attached the tubular eyelet 56, and thereafter the assembly is provided with the resin case 31. The eyelet 56 is shown with a closed end 85, which is opened after the molding operation to admit the impregnant. However, if desired, an open ended eyelet, such as shown in FIG. 9, may be used, in which case a temporary sealing member, such as the tube 39 shown in FIG. 15, may be desirably used during the molding operation as above described.

Among the many advantages of the methods of assembly, and the subassemblies above described, is the ease with which such can be used to reduce the number of physical operations necessary to the assembly and manufacture of a given number of capacitors. Thus when the preferred assembly methods shown in FIGS. 1 to 7, inclusive, or the alternate forms illustrated in FIGS. 11, 12, 13 and 14 are employed, a number of the supporting inserts may be assembled in the form of a rack, and the assembly of a number of the capacitors can be made on said rack and then transported thereon to the molding operation. Such multiple assembling methods may take various forms, one of which is illustrated in FIG. 25, where is shown a frame 83 on which are mounted a number of steel pins 84. The pins 84 are spaced along the frame at intervals corresponding to the distance between the centering slots 82 which merge into the mold cavities 81 of the multiple mold half 80. The pins 84 are sized and shaped to perform the functions described above with reference to the inserts 32, shown in FIGS. 2, 3, 4, 5, 11 and 12, and the capacitor units, and tubular elements are assembled thereon in the ways above described. Preforms of molding resins are provided. Thereafter the frame 83 is placed over the multiple mold half 80 to position the units in the mold cavity 81. In a similar manner a frame and rack, such as shown in FIG. 25, may be used to convey to a multiple molding operation those forms of the invention, as shown in FIGS. 20 and 21, where a tubular supporting element is a permanent part of the assembly. However, in this case the pins 84 serve only as carrying members and are sized to pass through the said tubular supporting elements, such as 55 in FIG. 20.

In the foregoing and in the drawings the invention has been described and illustrated with reference to a specific preferred form and several specific alternative forms. It will be apparent, however, that changes and modifications, as well as the substitution of equivalent parts or elements for those shown, may be made without departing from the broader scope and spirit of the invention as defined in the appended claims.

What I claim is:

1. In a capacitor assembly, a convolutely wound capacitor unit the inner surfaces of which define an axial passage therein, a metal terminal element at each end of said unit, at least one said terminal element being tubular, a perforate tubular element of electrical insulation positioned within said axial passage in the capacitor unit and axially aligned with said tubular terminal element, and a molded case surrounding the outer surface of said unit and at least a part of the outer surface of said tubular terminal element, the perforate element and the tubular terminal element providing a passage to and into the capacitor unit in said molded case.

2. A capacitor subassembly, comprising a convolutely wound capacitor unit, the inner surfaces of which define an axial passage therein, a non-yieldable elongated insert removably positioned within said passage and extending beyond the ends of said capacitor unit for defining the line of said passage externally of said unit and at least one metallic conducting tubular element mounted on an extending portion of said insert, said element having one end thereof positioned adjacent the end of said capacitor unit and the other end thereof spaced therefrom at least a distance sufficient to extend through a nonconducting casing moldable about said capacitor unit.

3. The subassembly as set forth in claim 2 wherein a tubular element is mounted on each extending portion of said insert and is positioned adjacent the ends of said capacitor unit.

References Cited in the file of this patent

UNITED STATES PATENTS

| | | |
|---|---|---|
| 2,383,890 | Robinson | Aug. 28, 1945 |
| 2,682,626 | Robinson et al. | June 29, 1954 |
| 2,704,880 | Brennan | Mar. 29, 1955 |

FOREIGN PATENTS

| | | |
|---|---|---|
| 493,070 | Great Britain | Oct. 3, 1938 |

UNITED STATES PATENT OFFICE
CERTIFICATE OF CORRECTION

Patent No. 3,156,854                            November 10, 1964

Haim Beyer

It is hereby certified that error appears in the above numbered patent requiring correction and that the said Letters Patent should read as corrected below.

In the grant, lines 2 and 12, and in the heading to the printed specification, lines 4 and 5, name of assignee, for "Cornell-Dubilier Corporation", each occurrence, read -- Cornell-Dubilier Electric Corporation --.

Signed and sealed this 20th day of April 1965.

(SEAL)
Attest:

ERNEST W. SWIDER                          EDWARD J. BRENNER
Attesting Officer                             Commissioner of Patents